Oct. 16, 1962  A. O. REYNOLDS  3,058,263
PLANT GROWER ASSEMBLY
Filed July 14, 1960  2 Sheets-Sheet 1

INVENTOR.
ALFRED O. REYNOLDS
BY
Harold B. Hood
ATTORNEY

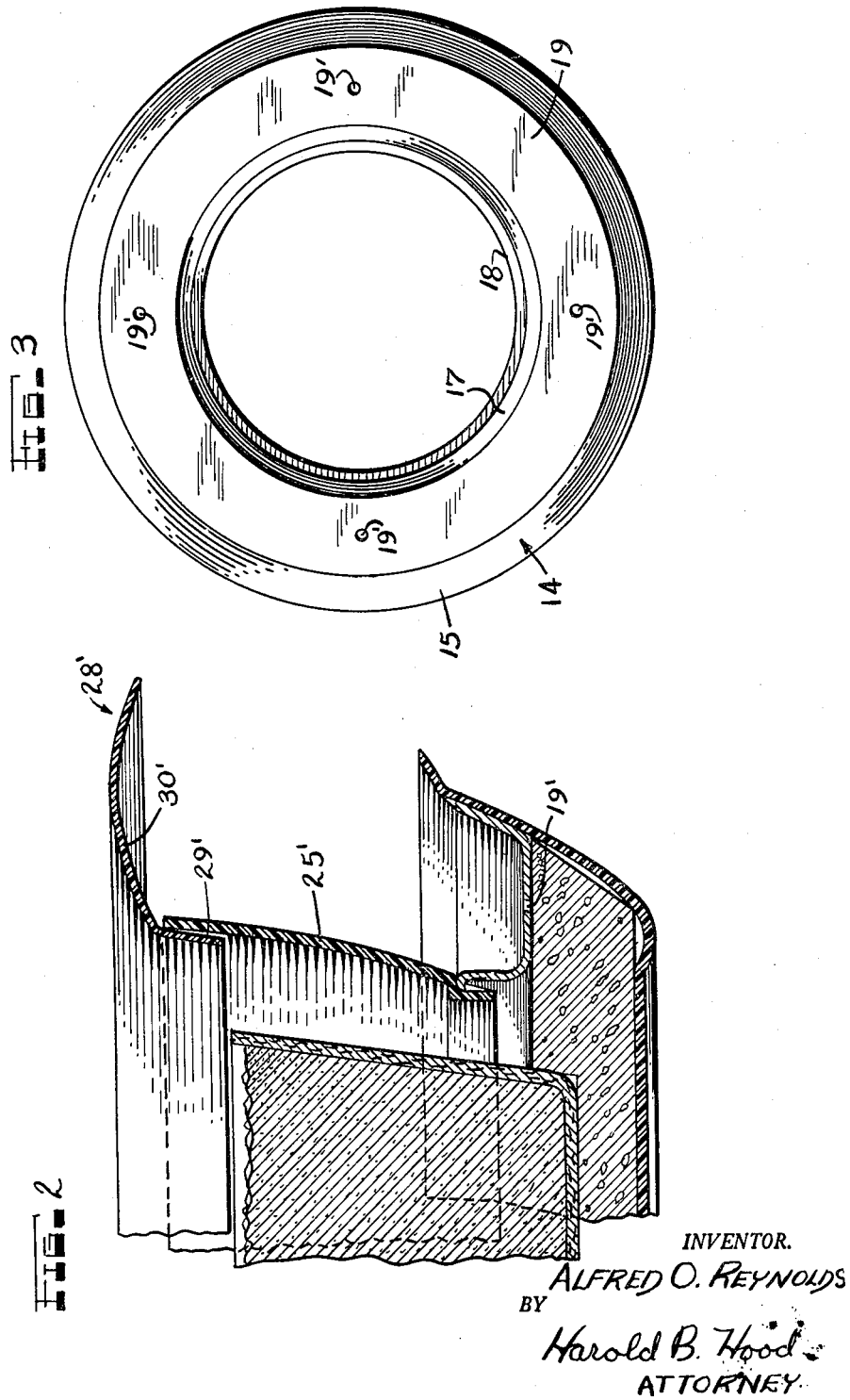

United States Patent Office 3,058,263
Patented Oct. 16, 1962

3,058,263
PLANT GROWER ASSEMBLY
Alfred O. Reynolds, Indianapolis, Ind.
(P.O. Box 112, Lebanon, Ind.)
Filed July 14, 1960, Ser. No. 42,919
3 Claims. (Cl. 47—38)

The present invention relates to a plant grower assembly and is primarily concerned with the provision of a container particularly adapted for use in growing African violets and other house plants. The device herein disclosed is unusually well adapted for plants which thrive best in an atmosphere of high humidity, and whose foliage tends, unless properly supported, to droop; yet the device has substantial advantages over previously known planters for use in growing plants of other types.

The primary object of the invention is to provide a device of the class described which is so designed as to maintain a high relative humidity in a circumscribed space within which the porous pot containing the growing medium for the plant is positioned.

A further important object of the invention is to provide, in such a device, constantly visible means which, upon inspection, will indicate whether or not an adequate water supply for the growing plant is present.

A still further object of the invention is to provide an assembly of the character described in which water is constantly supplied to the growing medium through the bottom and through the perimetral walls of the container for such medium, by means of capillary properties inherent in the container.

Still further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

FIG. 2 is a fragmental section of a modified form of plant grower assembly; and

FIG. 3 is a bottom plan view of the water metering vessel used with either assembly.

Figure 1:
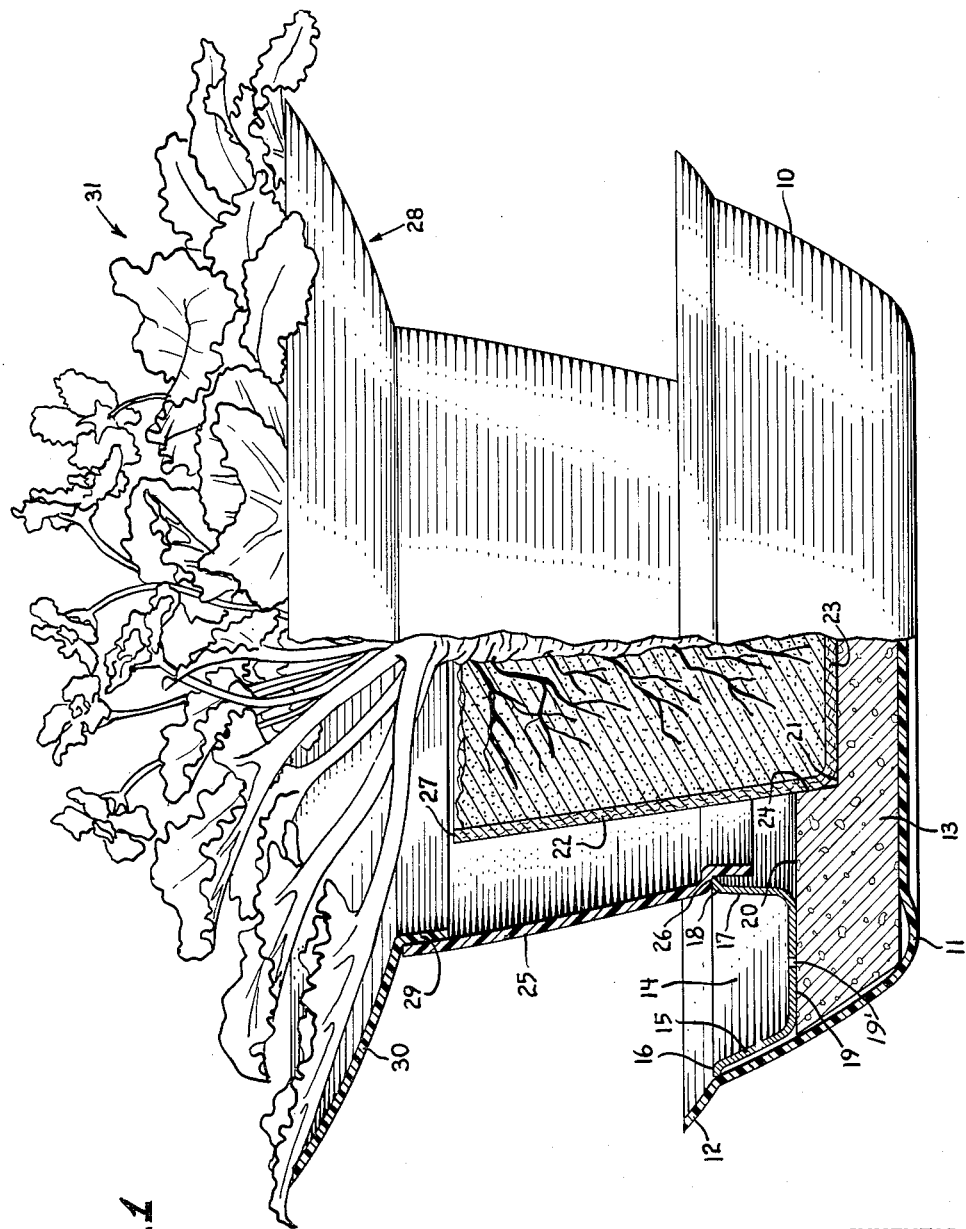
FIG. 1 is a side elevation, partly in section, of a plant grower assembly constructed in accordance with the present invention.

Referring more particularly to FIGS. 1 and 3, it will be seen that I have illustrated a saucer 10 which, in the preferred form of the invention, is formed to provide a depressed annular bead 11 at the rim of its bottom wall and preferably to provide a flaring lip 12 at its upper edge. Seated in the bottom of the saucer 10 is a block 13 of water-absorbent material, the perimetral contour of which preferably conforms closely to the internal contour of the saucer 10 so that the perimeter of the block is substantially in continuous contact with the perimetral wall of the saucer, at least at the upper and lower edges of the block.

The block 13 may be formed of any suitable, moisture-retaining material such as cotton, felt or other fabric, but I prefer to form said block from a foamed synthetic plastic, a number of which having suitable properties are available commercially. Among such suitable plastics are styrene foams and phenolic foams, both of which can be produced in forms which are highly moisture absorbent. An essential requirement, of course, is that the cells of the material shall be interconnecting so that the material is capable of holding relatively large quantities of water. Another substance which has been found satisfactory is a readily-wettable and highly-moisture-absorbent form of polyurethane foam which is a spongy non-fibrous mass made up of relatively thin walled, hollow, connecting cells and which is readily deformable but not fluent and will return to its original shape when relieved of deforming forces.

The vertical height of the block 13 is substantially less than that of the saucer 10, and an annular, open-topped metering vessel 14 is supported on the upper surface 20 of the block. As shown, said vessel comprises an external perimetral wall 15 terminating in an outturned lip 16, an internal wall 17 likewise terminating in an outturned lip 18, and a bottom wall 19 whose external surface may preferably be shaped to conform to the uppermost surface 20 of the block 13. As illustrated, the conforming surfaces of the wall 19 and the block 13 are flat, and I presently prefer such an arrangement; but the desirable characteristic is that the wall 19 shall largely cover the outer portion of the surface 20 to guard it against the direct evaporative effect of moving air. The wall 19 of the vessel 14 is formed with a few small, peripherally-spaced seepage ports 19', so proportioned and arranged that water will flow slowly from the vessel 14 into the mass of the block 13, whereby said vessel may be used roughly to measure the amount of water supplied to the assembly at any given filling. The arrangement of the ports 19' further tends to distribute such water uniformly through the mass of the block 13. It is desirable to keep the block saturated but not to cause or permit unabsorbed water to stand on the upper surface 20 of the block 13. The ports 19' should be large enough to inhibit clogging by pot fibres, particles of growing medium or the like, yet small enough to permit only seepage flow from the vessel 14 to the block 13. For instance, in a vessel whose internal diameter is 3.67", whose external diameter is 6.70" and whose height is 5/8", I provide four ports 19', each 3/32" in diameter and spaced at 90° intervals.

Preferably, the vessel 14 is so constructed and arranged that the distal edge of its lip 16 bears continuously upon the wall of the saucer 10, preferably along the line of the break between the body of said wall and the lip 12, the combined height of the block 13 and the vessel 14 being less than the height of the saucer 10.

A socket 21 is formed in the upper surface of the block 13, said socket being centrally arranged in the illustrated embodiment of the invention; and a pot 22 is snugly received in said socket, the bottom wall 23 of said pot being in intimate contact with the bottom of the socket 21 over a substantial area, and an appreciable portion of the upstanding, perimetral walls of the pot, near the base thereof, preferably being in intimate contact with the perimetral wall 24 of the socket 21. In the preferred embodiment of my invention, a fibrous pot, such as the well known, so-called "peat moss transplanter pots" of commerce will be used in the assembly; but many of the advantages of the invention can be attained even if a clay pot is used. The essential requirement is that at least a major portion of the external surface of the pot unit shall possess capillary characteristics so that moisture may be readily and copiously evaporated therefrom into the immediately surrounding region as and for the reasons to be explained.

An annular shell 25 is formed, adjacent its base to provide an annular shoulder which rests upon the lip 18 of the vessel 14 to support the shell in circumscribing, spaced relation to the pot 22; and the height of said shell is so designed that the shell extends substantially above the upper end 27 of the pot 22. A collar, indicated generally by the reference numeral 28, is formed to provide a short tubular section 29 which is snugly telescoped within the upper end of the shell 25, and to provide a flange 30 whose radial extent is suitably proportioned relative to the average foliage diameter of the plants for which the device is intended and preferably somewhat exceeds the radius of the saucer 10.

In the drawing, I have illustrated an African violet growing in a planter constructed in accordance with the present invention; and it will be seen that the foliage 31 rests upon and is supported by the flange 30 of the collar 28. It is well known that the African violet thrives best in an atmosphere of high humidity, but that, if its foliage is permitted to rest upon the rim of a conventional pot or planter, deterioration occurs at the point of contact. Therefore, it is desirable to support the foliage 31 against contact with the edge or lip 27 of the pot; and the flange 30 of the collar 28 accomplishes that purpose. Furthermore, the collar flange also tends to "bunch" the foliage 31, preventing it from spreading and thereby establishing the foliage as a partial closure for the upper end of the chamber defined by the block 13, the shell 25 and the collar 28. Since it will be apparent that, through the above-described capillary action, the entire surface of the perimetral wall of the pot 22 is kept quite moist, it will be seen that evaporation from said wall will tend to create and maintain a very high humidity in that chamber. On the other hand, the pot wall is not maintained in a condition of complete saturation, and therefore air can penetrate the perimetral pot wall to provide the high degree of aeration of the growing medium which is recognized as desirable for African violets and similar plants.

In use, the block 13 is substantially saturated in any desired manner and the pot 22 is snugly seated in the socket 21. Moisture will be drawn from the block, by the capillary action of the pot walls, and the growing medium inside the pot will thereby be moistened to a satisfactory degree. The vessel 14, shell 25 and collar 28 will now be assembled, and if saturation of the block 13 has been significantly depleted by the above-mentioned capillary action, water will be poured into the vessel 14 whence it will flow slowly through the ports 19' to restore saturation of the block 13. Within a relatively short time, satisfactory moisture conditions in the growing medium will be established and a high degree of humidity will be established in the chamber in which the pot 22 is located. As time passes, the degree of saturation of the block 13 will slowly fall.

It will be clear from inspection of the drawing that the vessel 14 is readily visible at all times, particularly since the foliage 31 is held against drooping into proximity to said vessel. Preferably, the vessel 14 is so proportioned to the other elements of the assembly that, when moisture has been drawn from the block 13 by the pot 22 and the growing medium therein to such an extent as to leave the block too dry to supply further moisture at the needed rate, a quantity of water sufficient, when poured quickly into the vessel 14, to fill that vessel almost to its lips 16 and 18, will seep through the ports 19' in two to three minutes to resaturate the block 13, but will not be sufficient to stand above the surface of said block. If, by inadvertence, too large a quantity of water is added, an attendant, observing water standing in the vessel 14 above the bottom wall 19 thereof more than about three minutes after the refilling step, will thereby be warned of the presence of excessive water and can discharge the excess by tilting the entire assembly.

The form of assembly illustrated in FIG. 2 differs from that just described primarily in the shape of the collar 28'. As before, said collar is formed to provide a short tubular section 29' which is snugly telescoped within the upper end of the shell 25'; but the flange 30' is upwardly convex to allow a more relaxed and graceful arrangement of foliage and to reduce the tightness of the bunching thereof which results from the shape of the flange 30.

In both forms, however, the metering vessel, the shell 25 and the collar flange 30 or 31' cooperate, together with the flange-supported foliage of the plant itself, to define a relatively dead-air space enclosing the pot, the growing medium and the stalks or stems of the plant and in which through the above-described evaporative action from the capillary walls of the pot, an atmosphere of high humidity, as compared with the circumambient atmosphere, will be maintained. In both forms, furthermore, means for supporting the plant foliage against excessive drooping is provided, and that means is of such character that its foliage-supporting surfaces will not be particularly damp and will not be likely to gather any high concentration of substances which have a toxic effect on the plant foliage.

I claim as my invention:

1. A plant grower assembly comprising a saucer, a block of water-absorbent material seated in said saucer and having substantially continuous perimetral bearing against the perimetral wall of said saucer, said block having a vertical height less than that of said saucer and being formed with a central socket in its upper surface, an annular, upwardly-opening vessel seated on the upper surface of said block and substantially in perimetral contact with said saucer wall, said vessel being provided with peripherally-spaced ports in its block-engaging wall, the height of said saucer being at least equal to the combined height of said block and said vessel, a porous pot having its base received in said socket, an annular shell supported from said vessel and circumscribing said pot in radially spaced relation thereto, and a collar supported from the upper end of said shell, said collar having a flaring flange at least the inner perimeter of which is located above the upper end of said pot.

2. A plant grower assembly comprising a saucer, a block of foamed plastic, externally conforming generally to the internal perimetral contour of said saucer, seated in said saucer and provided with a socket in its upper surface, an annular, open-topped vessel received in said saucer and having a ported floor in intimate contact with the upper surface of said block, the combined height of said block and said vessel being less than the height of said saucer, a porous pot having its base snugly received in said socket with the bottom and at least a portion of the perimetral wall of said pot in intimate contact with the material of said block, at least a major portion of said pot having capillary properties, an annular shell supported from said vessel and circumscribing said pot in radially spaced relation thereto, and a collar supported from the upper end of said shell, said collar having a flaring flange at least the inner periphery of which is located above the upper end of said pot.

3. A plant grower assembly comprising an open-topped container substantially impervious to water, a block of rigid, moisture-absorbent material seated in said container and held against substantial horizontal movement therein by engagement with the perimetral wall of said container, a porous pot supported on said block with its bottom in intimate contact with said block, at least a major portion of said pot having capillary properties, an annular, open-topped vessel received in said container in circumscribing relation to said pot and having a moisture-permeable floor in intimate contact with, and supported from, said block, the top of said vessel being disposed below the top of said container, an annular shell supported from said vessel and circumscribing said pot in radially spaced relation thereto, and a collar supported from the upper end of said shell, said collar having a flaring flange at least the inner periphery of which is located above the upper end of said pot.

References Cited in the file of this patent

UNITED STATES PATENTS

| | | |
|---|---|---|
| 910,905 | Clements | Jan. 26, 1909 |
| 1,342,786 | White | June 8, 1920 |
| 1,879,784 | Benz | Sept. 27, 1932 |
| 1,989,403 | Dauernheim | Jan. 29, 1935 |
| 2,072,172 | Lockyer | Mar. 2, 1937 |
| 2,189,982 | Haglund | Feb. 13, 1940 |
| 2,785,508 | Coleman | Mar. 19, 1957 |
| 2,810,235 | Magid | Oct. 22, 1957 |
| 2,922,254 | Smithers | Jan. 26, 1960 |